US011890624B2

(12) United States Patent
Lin et al.

(10) Patent No.: US 11,890,624 B2
(45) Date of Patent: Feb. 6, 2024

(54) SHOWER HEAD

(71) Applicant: FUJIAN XIHE SANITARY WARE TECHNOLOGY CO., LTD., Fujian (CN)

(72) Inventors: Xiaofa Lin, Fujian (CN); Xiaoshan Lin, Fujian (CN); Zhiwei Chen, Fujian (CN); Feiming Deng, Fujian (CN); Xiaoqing Deng, Fujian (CN); Qiqiao Liu, Fujian (CN)

(73) Assignee: FUJIAN XIHE SANITARY WARE TECHNOLOGY CO., LTD., Fujian (CN)

( * ) Notice: Subject to any disclaimer, the term of this patent is extended or adjusted under 35 U.S.C. 154(b) by 141 days.

(21) Appl. No.: 17/486,940

(22) Filed: Sep. 28, 2021

(65) Prior Publication Data

US 2022/0134360 A1 May 5, 2022

(30) Foreign Application Priority Data

Oct. 30, 2020 (CN) ......................... 202011196033.X

(51) Int. Cl.
*B05B 1/16* (2006.01)
*B05B 1/18* (2006.01)

(52) U.S. Cl.
CPC .............. *B05B 1/1645* (2013.01); *B05B 1/18* (2013.01)

(58) Field of Classification Search
CPC ....... B05B 1/1645; B05B 1/18; B05B 1/1636; B05B 1/30
See application file for complete search history.

(56) References Cited

U.S. PATENT DOCUMENTS

2003/0062426 A1* 4/2003 Gregory .................. B05B 1/323 239/533.13
2013/0032647 A1* 2/2013 Zhou ..................... B05B 1/1654 239/562

* cited by examiner

*Primary Examiner* — Qingzhang Zhou
(74) *Attorney, Agent, or Firm* — JCIPRNET

(57) ABSTRACT

A shower head includes a shower head body having a water inlet channel, a first leather cup, a surface cover assembly, a water dispensing plate located between the shower head body and the surface cover assembly, and an adjusting device having a driving mechanism and a rotating mechanism. A first water outlet communicating with the water inlet channel penetrates the first leather cup. Two sides of the water dispensing plate respectively cooperate with the shower head body and the surface cover assembly to enclose an installation cavity and a water outflow cavity. The water dispensing plate has a first water passage hole communicating with the water outflow cavity. The driving mechanism is rotatably connected to the shower head body. The rotating mechanism is located inside the installation cavity and abuts against the first leather cup and the water dispensing plate. The driving mechanism drives the rotating mechanism to rotate to adjust a water outflow area.

7 Claims, 10 Drawing Sheets

SHOWER HEAD

CROSS-REFERENCE TO RELATED APPLICATION

This application claims the priority benefit of China application serial no. 202011196033.X, filed on Oct. 30, 2020. The entirety of the above-mentioned patent application is hereby incorporated by reference herein and made a part of this specification.

BACKGROUND

Technical Field

The disclosure relates to a field of sanitary products, and in particular, relates to a shower head.

Description of Related Art

Regarding the shower heads provided by the prior art, the flow adjusting devices are usually arranged in the water inlet channels of the shower heads, and the adjusting devices are completely soaked in water. In the case that the amount of flowing is adjusted by driving an adjusting device, with presence of the water pressure, the switching pressure may be relatively large and such switching is thus laborious. Poor user experience is inevitably provided. Generally, when a shower head is required to be turned off, the shower head is turned off through the water outflow switch away from the shower head. When holding a shower head in one hand, if a user wants to turn off the shower head temporarily, the user has to go near the water outflow switch to turn off the shower head, and the user thus experiences an inconvenient user experience.

SUMMARY

The following is a brief description of the subject to be explained in detail in the specification, and the brief description is not intended to limit the protection scope of the claims.

To accomplish the foregoing purpose, the following technical solutions are adopted.

The embodiments of the disclosure provide a shower head including a shower head body, a first leather cup, a surface cover assembly, a water dispensing plate, and an adjusting device. The shower head body is provided with a water inlet channel. The first leather cup is installed in the water inlet channel and is provided with a first water outlet communicating with the water inlet channel. The water dispensing plate is located between the shower head body and the surface cover assembly, hermetically encloses an installation cavity and a water outflow cavity respectively together with the shower head body and the surface cover assembly, and is provided with a first water passage hole communicating with the water outflow cavity. The adjusting device includes a driving mechanism and a rotating mechanism. The driving mechanism is rotatably connected to the shower head body and includes an operating portion at least partially exposed outside the shower head body. The rotating mechanism is located inside the installation cavity and hermetically abuts against the first leather cup and the water dispensing plate. The rotating mechanism is provided with a second water passage hole. The driving mechanism drives the rotating mechanism to rotate, so as to adjust a water outflow area which is formed by the overlapped area of the first water outlet and the second water passage hole. A flowing amount of the shower head may be adjusted and water outflowing may be paused. Further, water may only flow out from the first water passage hole after flowing from the first water outlet to the second water passage hole, and in this way, the adjusting device may not be soaked in water.

To make the aforementioned more comprehensible, several embodiments accompanied with drawings are described in detail as follows.

BRIEF DESCRIPTION OF THE DRAWINGS

To make the technical solutions provided in the embodiments of the disclosure more clearly illustrated, several accompanying drawings required by the embodiments for description are briefly introduced as follows.

DESCRIPTION OF THE EMBODIMENTS

The accompanying drawings in the embodiments of the disclosure are included to provide a clear and complete description of the technical solutions provided in the embodiments of the disclosure.

Figure 1:
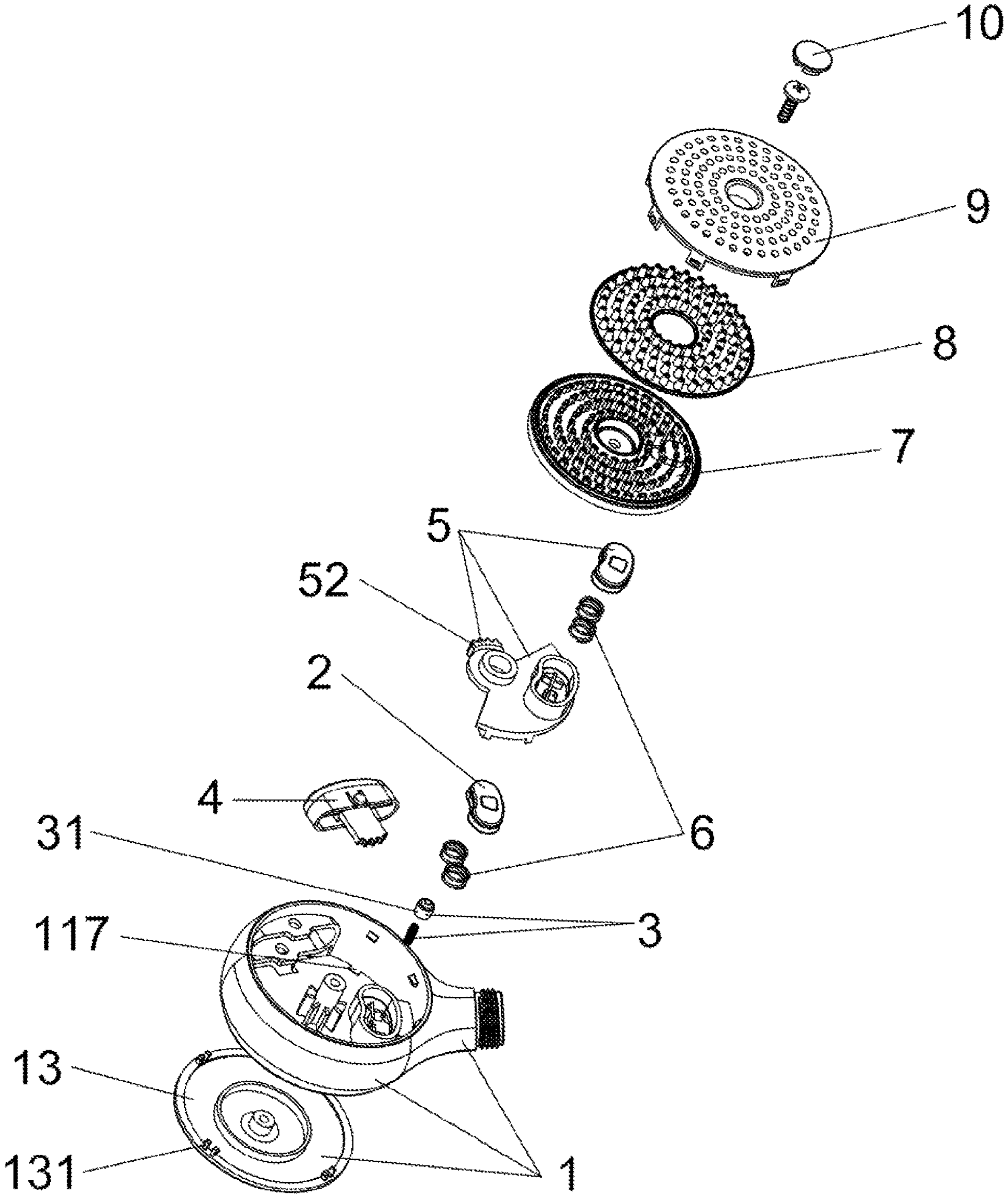
FIG. 1 is a three-dimensional exploded schematic view of a shower head according to an embodiment of the disclosure.

With reference to FIG. 1, FIG. 1 illustrates a shower head 100 including a shower head body 1, a first leather cup 2, an elastic spring plunger 3, an adjusting device, second elastic members 6, a water dispensing plate 7, a screw, a surface cover assembly, and a decoration cover 10.

Figure 2:
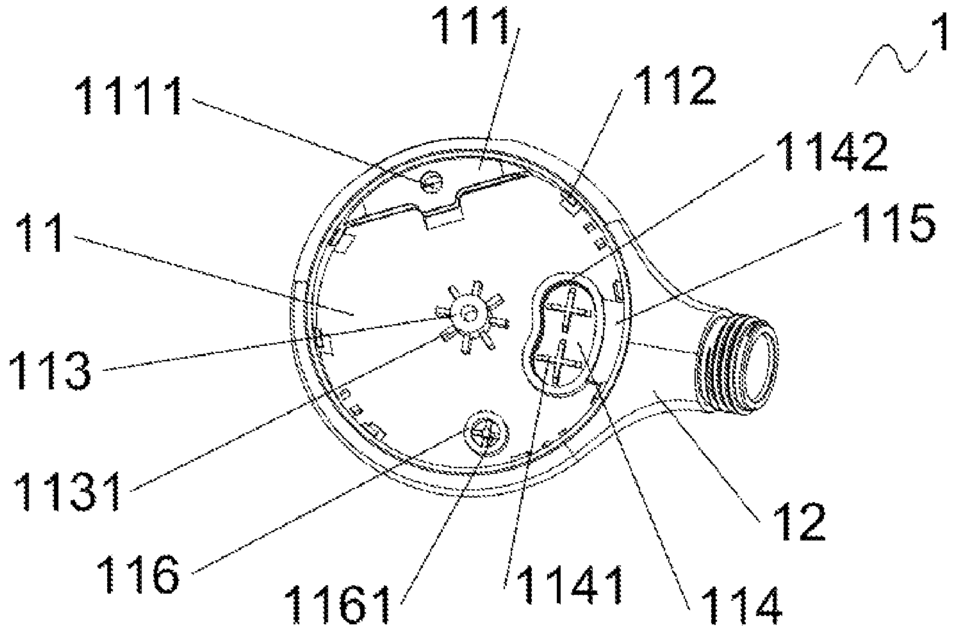
FIG. 2 is a three-dimensional schematic view of a structure of a shower head body according to an embodiment of the disclosure.

Specifically, as shown in FIG. 2, the shower head body 1 includes a head portion 11, a handle portion 12, and rear cover 13. The head portion 11 substantially is a cylinder structure with an open end, and a side wall of the cylinder is provided with a button installation hole 111 and a plurality of first engaging blocks 112. An inner wall of a bottom portion of the cylinder is provided with a first rotating shaft 113, a second installation groove 114, an irregular column 115, an elastic spring plunger groove 116, and a plurality of engaging slots 117. The button installation hole 111 extends from an outer side wall of the cylinder of the head portion 11 into an inner cavity of the cylinder of the head portion 11, and a hole wall located in the inner cavity of the cylinder of the head portion 11 is provided with two engaging holes 1111 opposite to each other whose axis direction is parallel to an axis direction of the head portion 11. The first engaging blocks 112 are evenly distributed on an inner side wall of the cylinder of the head portion 11 and avoid the button installation hole 111. The first rotating shaft 113 extends from a central position of the inner wall of the bottom portion of the head portion 11 towards an opening end of the head portion 11. An outer wall, close to the bottom portion of the head portion 11, of the first rotating shaft 113 is evenly distributed with first protruding columns 1131 extending to the inner wall of the bottom portion of the head portion 11, and the end surface of each of the first protruding columns 1131 close to the opening end of the head portion 11 form a position-limiting surface together. A central position of the first rotating shaft 113 is provided with a threaded hole. The second installation groove 114 extends from the inner wall of the bottom portion of the head portion 11 towards the opening end of the head portion 11. Two first protruding ribs 1141 extending towards the opening end of the head portion 11 are provided in symmetrical positions of a bottom portion of the second installation groove 114, and a first step surface 1142 facing an opening end of the second installation groove 114 is provided on a groove wall of the second installation groove 114. The irregular column 115 extends from one side, close to the side wall of the cylinder of the head portion 11, of the second installation groove 114 towards an outer wall of the cylinder of the head portion 11, and the irregular column 115 is provided with a first through hole 1151 penetrating the outer side wall of the cylinder of the head portion 11 and the groove wall of the second installation groove 114. The elastic spring plunger groove 116 extends from the inner wall of the bottom portion of the head portion 11 towards the opening end of the head portion 11, and a bottom portion of the elastic spring plunger groove 116 is provided with a second protruding rib 1161 extends towards the opening end of the head portion 11. A central position of the second protruding rib 1161 is provided with a second protruding column 1162 extending towards the opening end of the head portion 11. The engaging slots 117 are disposed on and penetrating through the bottom portion of the head portion 11 and avoid the button installation hole 111.

Figure 15:
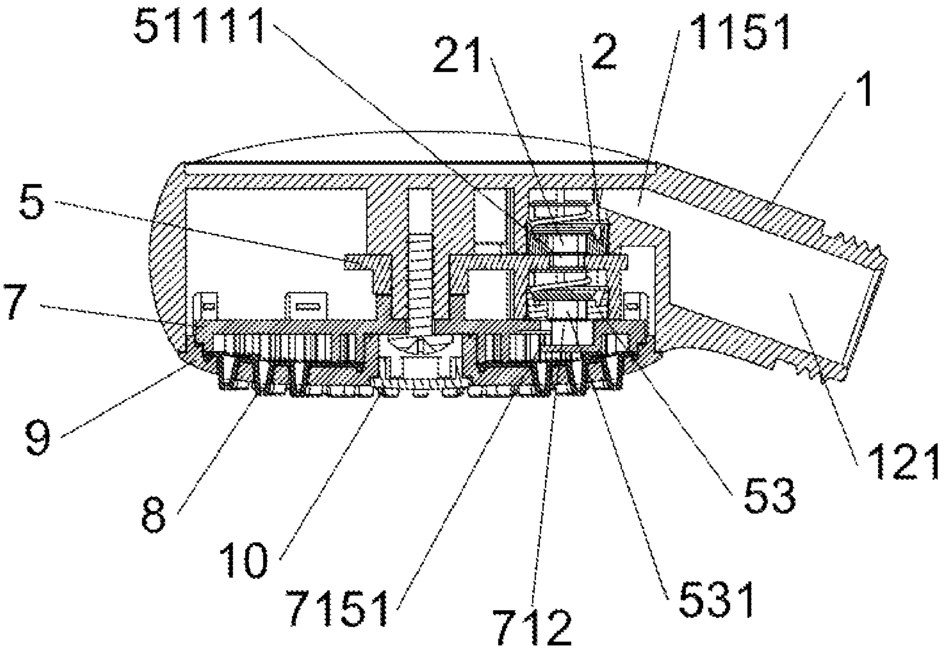
FIG. 15 is a cross-sectional schematic view of a structure in FIG. 14 taken along a line A-A according to an embodiment of the disclosure.

As shown in FIG. 2 and FIG. 15, one end of the handle portion 12 is fixedly connected onto the outer wall of the cylinder of the head portion 11, and a second through hole 121 penetrates the handle portion 12 internally. One end of the second through hole 121 communicates with the first through hole 1151 of the irregular column 115, and the other end of the second through hole 121 is configured to communicate with an external water outlet. The first through hole 1151, the second through hole 121 and the second installation groove 114 form a water inlet channel of the shower head body together.

As shown in FIG. 1, the rear cover 13 is a circular surface cover, and second engaging blocks 131 fitted to the engaging slots 117 protrude from a periphery of the rear cover 13.

Figure 3:
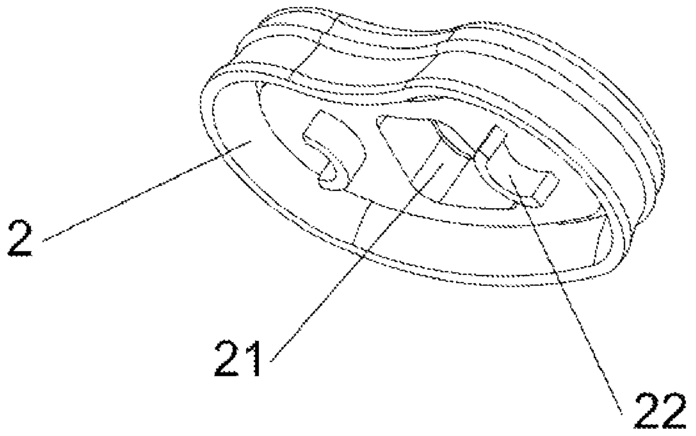
FIG. 3 is a three-dimensional schematic view of a structure of a first leather cup according to an embodiment of the disclosure.

As shown in FIG. 3, the first leather cup 2 is made of an elastic material, an inner wall of a bottom portion of the first leather cup 2 is provided with a first water outlet 21 penetrating the inner wall and two symmetrical arc-shaped first protruding blocks 22, and a sealing rib fitted to the groove wall of the second installation groove 114 is disposed on an outer side wall of a leather cup body.

Figure 16:
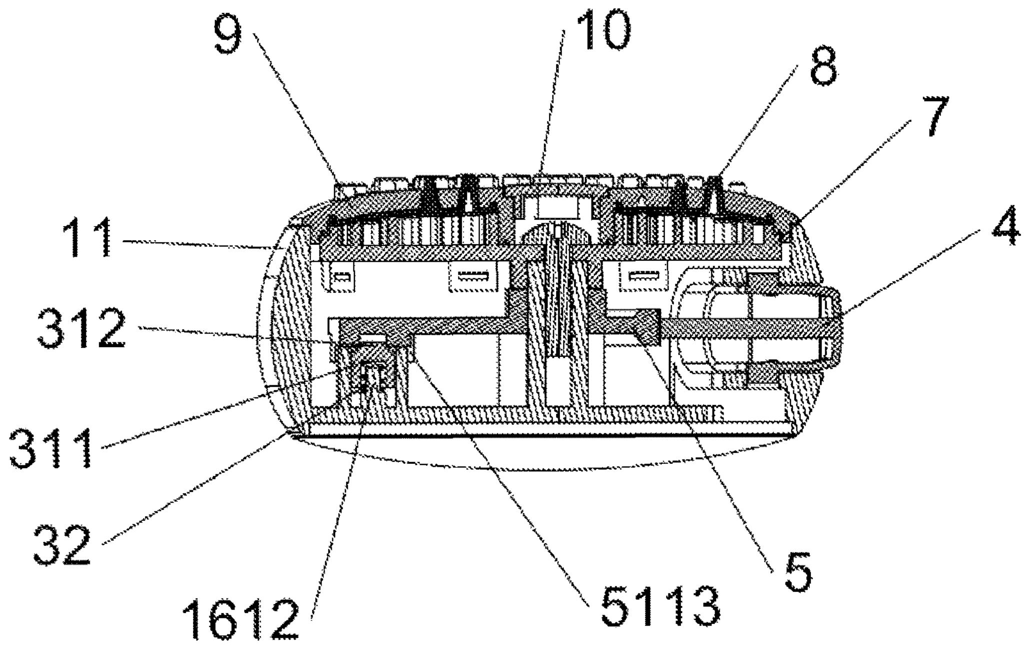
FIG. 16 is a cross-sectional schematic view of the structure in FIG. 14 taken along a line B-B according to an embodiment of the disclosure.
Figure 17:
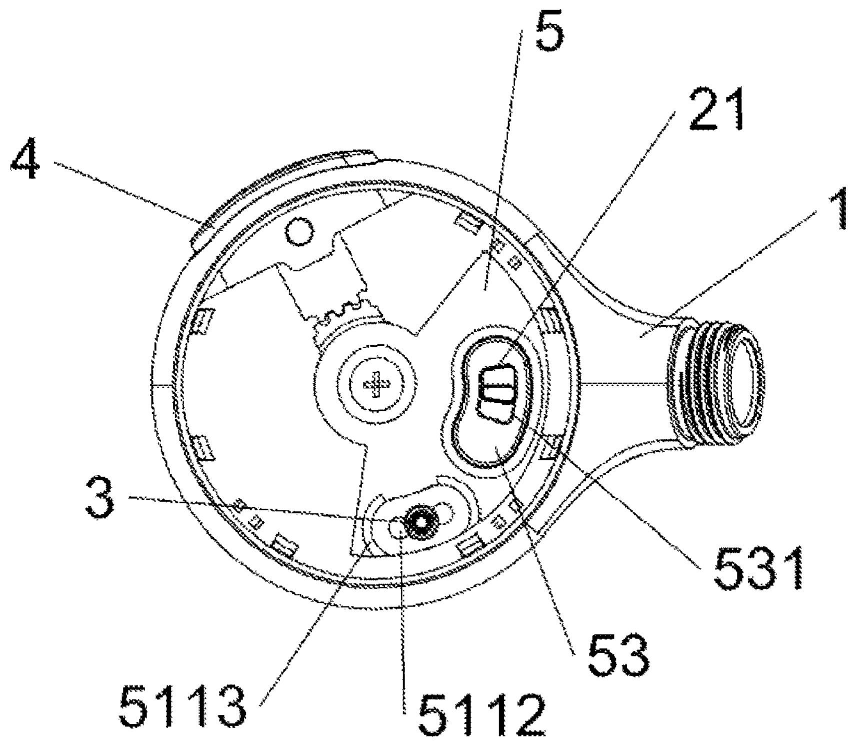
FIG. 17 is schematic view of a structure of the shower head in a low water outflow mode according to an embodiment of the disclosure.
Figure 18:
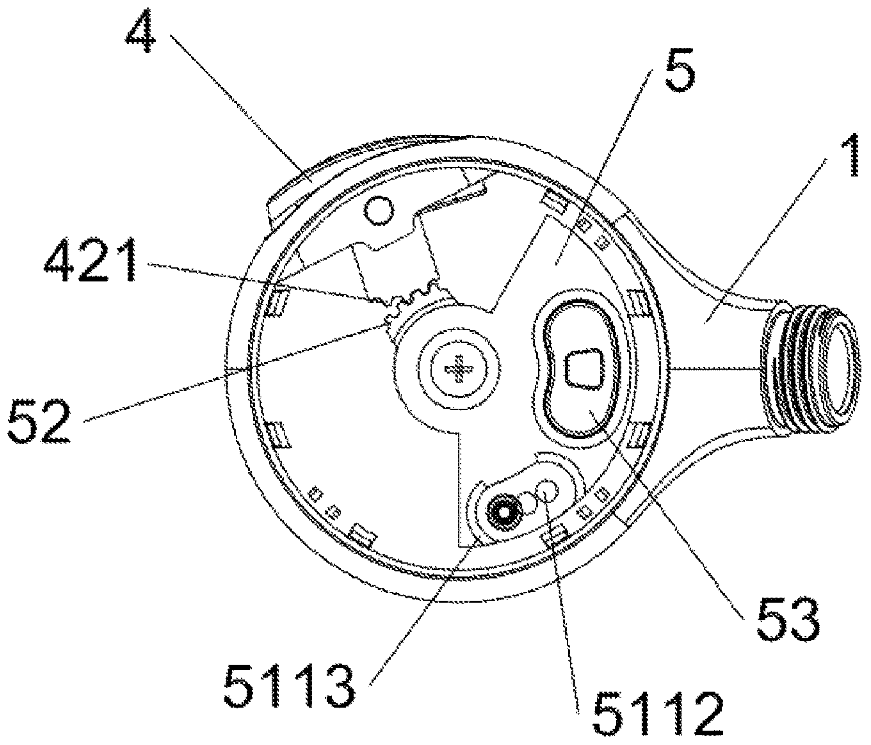
FIG. 18 is schematic view of the structure of the shower head in a high water outflow mode according to an embodiment of the disclosure.
Figure 19:
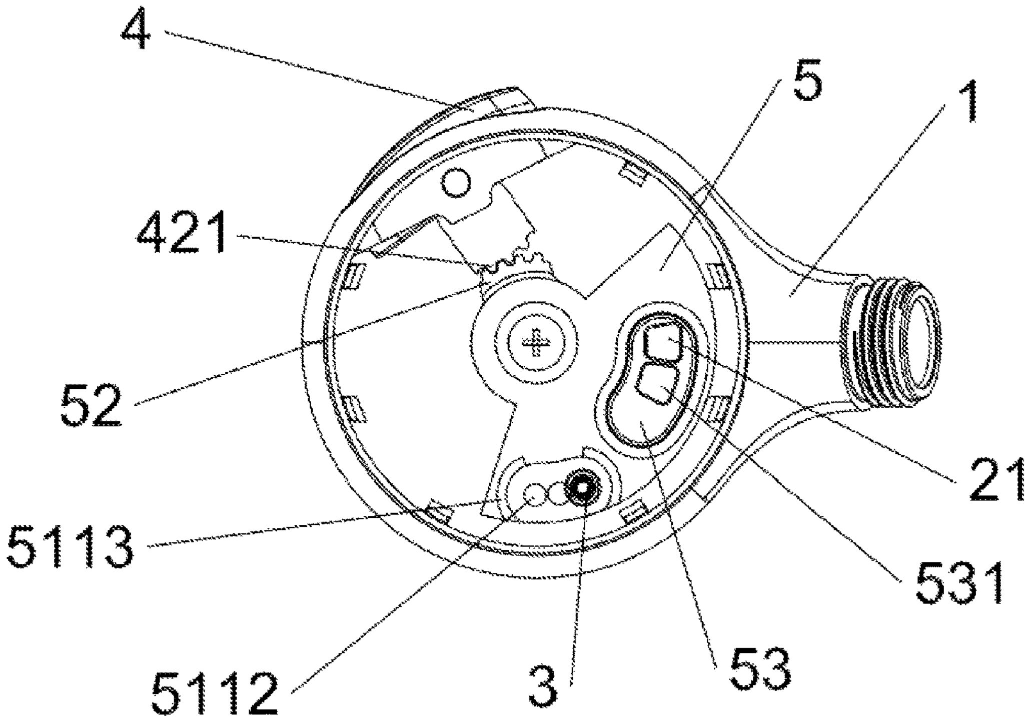
FIG. 19 is schematic view of the structure of the shower head in a water outflow pause mode according to an embodiment of the disclosure.

As shown in FIG. 1 and FIG. 16, the elastic spring plunger 3 includes a spring plunger 31 and a first elastic member 32, and the spring plunger 31 includes a spring plunger body 311 and a positioning bead 312. The spring plunger body 311 is a cylindrical body, and an outer diameter of the cylindrical body is fitted to an inner diameter of the elastic spring plunger groove 116. The positioning bead 312 protrudes from an outer wall of a bottom portion of the spring plunger body 311, and the first elastic member 32 is a spring.

Figure 4:
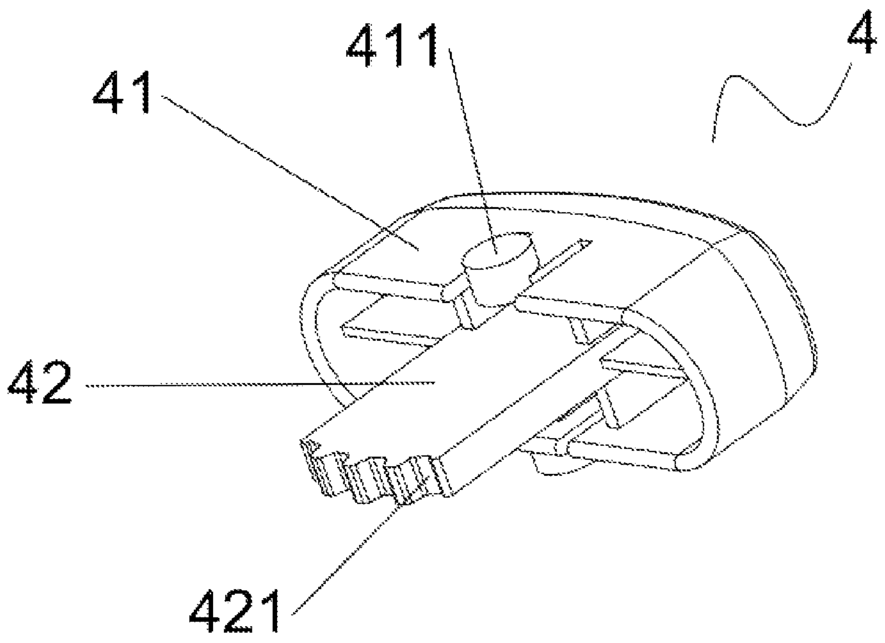
FIG. 4 is a three-dimensional schematic view of a structure of a driving mechanism according to an embodiment of the disclosure.
Figure 5:
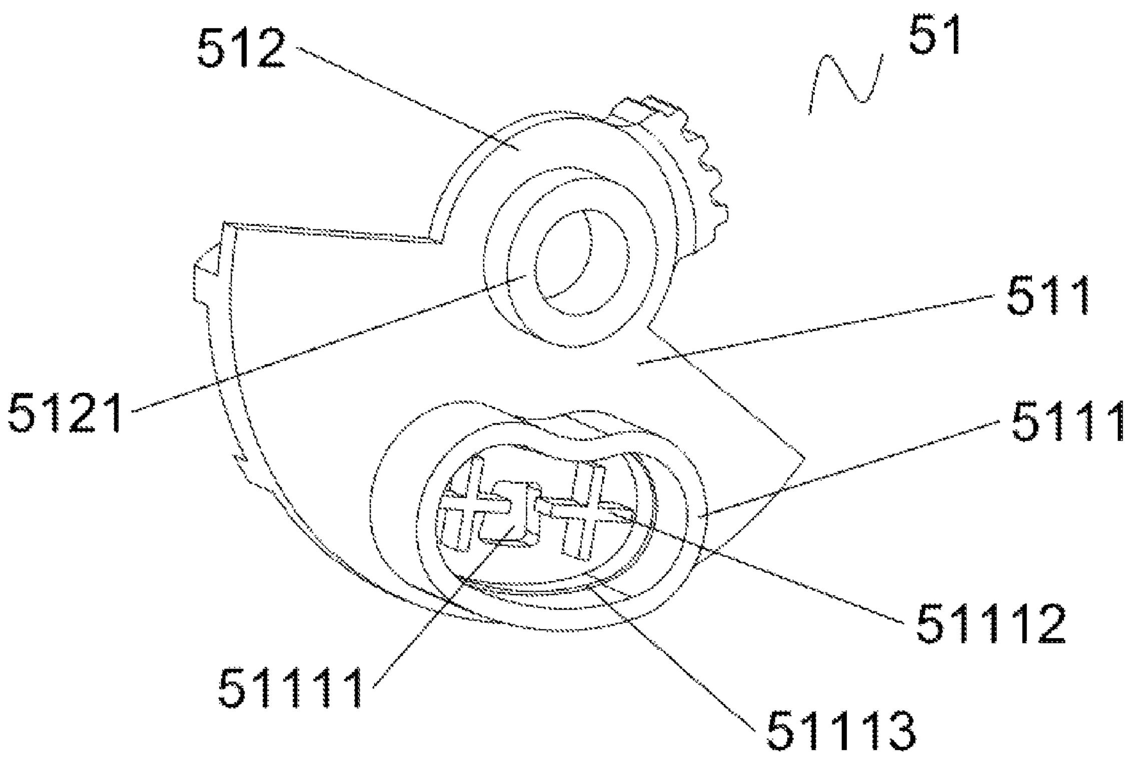
FIG. 5 is a three-dimensional schematic view of a structure of a rotation plate from a first viewing angle according to an embodiment of the disclosure.
Figure 6:
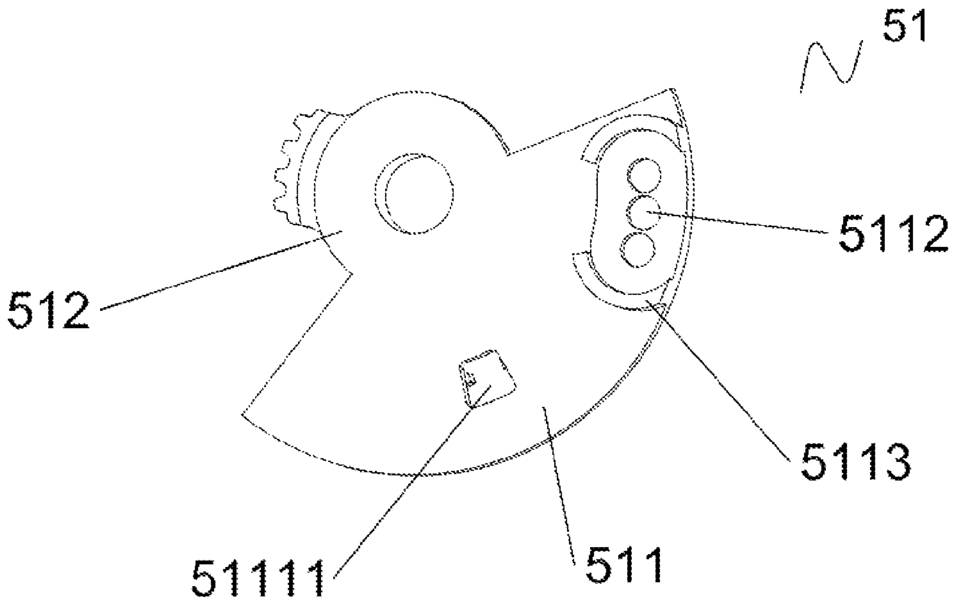
FIG. 6 is a three-dimensional schematic view of the structure of the rotation plate from a second viewing angle according to an embodiment of the disclosure.
Figure 7:
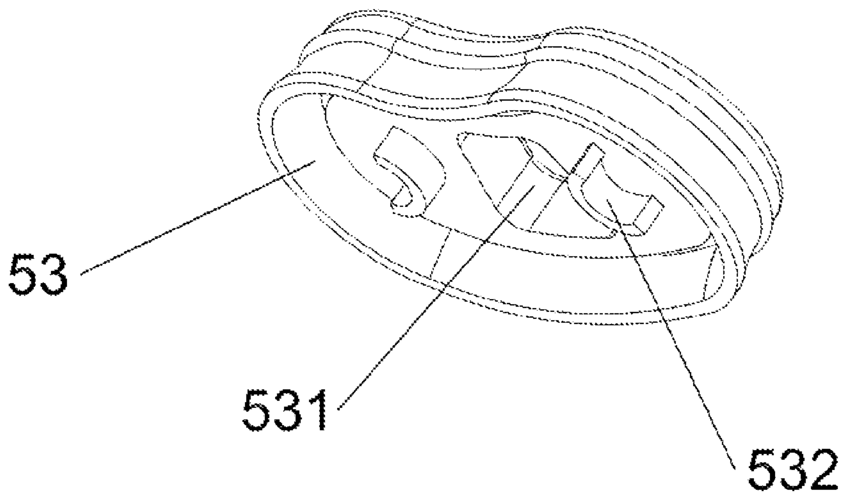
FIG. 7 is a three-dimensional schematic view of a structure of a second leather cup according to an embodiment of the disclosure.

As shown in FIG. 1 and FIG. 4, the adjusting device includes a driving mechanism 4 and a rotating mechanism 5, and the driving mechanism 4 includes a rocker button 41 and a driving plate 42. Two round buckles 411 fitted to the engaging holes 1111 protrude from symmetrical positions of an outer side wall of the rocker button 41. One end of the driving plate 42 is fixed inside the rocker button 41, and the other end of the driving plate 42 is provided with a driving rack 421 and extends into the inner cavity of the cylinder of the head portion 11.

As shown in FIG. 1 and FIG. 5 to FIG. 7, the rotating mechanism 5 includes a rotation plate 51, a transmission rack 52, and a second leather cup 53, and the rotation plate 51 includes a first sector plate 511 and a second sector plate 512 which are coaxially and integrally connected. A first installation groove 5111 protrudes from a surface of one side of the first sector plate 511. A bottom portion of the first installation groove 5111 is provided with a second water passage hole 51111 and two symmetrical third protruding ribs 51112 extending in an opening direction of the first installation groove 5111, and a groove wall of the first installation groove 5111 is provided with a second step surface 51113 facing an opening end of the first installation groove 5111. Three concave positioning grooves 5112 are circumferentially disposed on a surface of the other side of the first sector plate 511, and one side, facing away from the positioning groove in the middle part, of each of the two positioning grooves 5112 in the upper part and in the lower part respectively is provided with an arc-shaped blocking wall 5113. A first shaft sleeve 5121 protrudes from a rotation center of a surface of the second sector plate 512 on the same side as the first installation groove 5111, and an inner hole of the first shaft sleeve 5121 is fitted to the first rotating shaft 113 and penetrates the second sector plate 512. The transmission rack 52 has an arc shape, is coaxial with the second sector plate 512, and is fixed onto the second sector plate 512. The second leather cup 53 is made of an elastic material, a bottom portion of the second leather cup 53 is provided with a third water passage hole 531 penetrating the bottom portion and two symmetrical arc-shaped second protruding blocks 532, and a sealing rib fitted to the groove wall of the first installation groove 5111 is disposed on an outer side wall of a leather cup body.

As shown in FIG. 1, the second elastic members 6 include four springs. One ends of the two springs are sleeved outside the two first protruding ribs 1141 in the second installation groove 114 and abut against the bottom portion of the second installation groove 114, and the other ends of the two springs are sleeved outside the first protruding blocks 22 on the inner wall of the bottom portion of the first leather cup 2 and abut against the inner wall of the bottom portion of the first leather cup 2. One ends of the rest of the two springs are sleeved outside the third protruding ribs 51112 in the first installation groove 5111 and abut against the bottom portion of the first installation groove 5111, and the other ends of the rest of the two springs are sleeved outside the second protruding blocks 532 on the inner wall of the bottom portion of the second leather cup 53 and abut against the inner wall of the bottom portion of the second leather cup 53.

Figure 8:
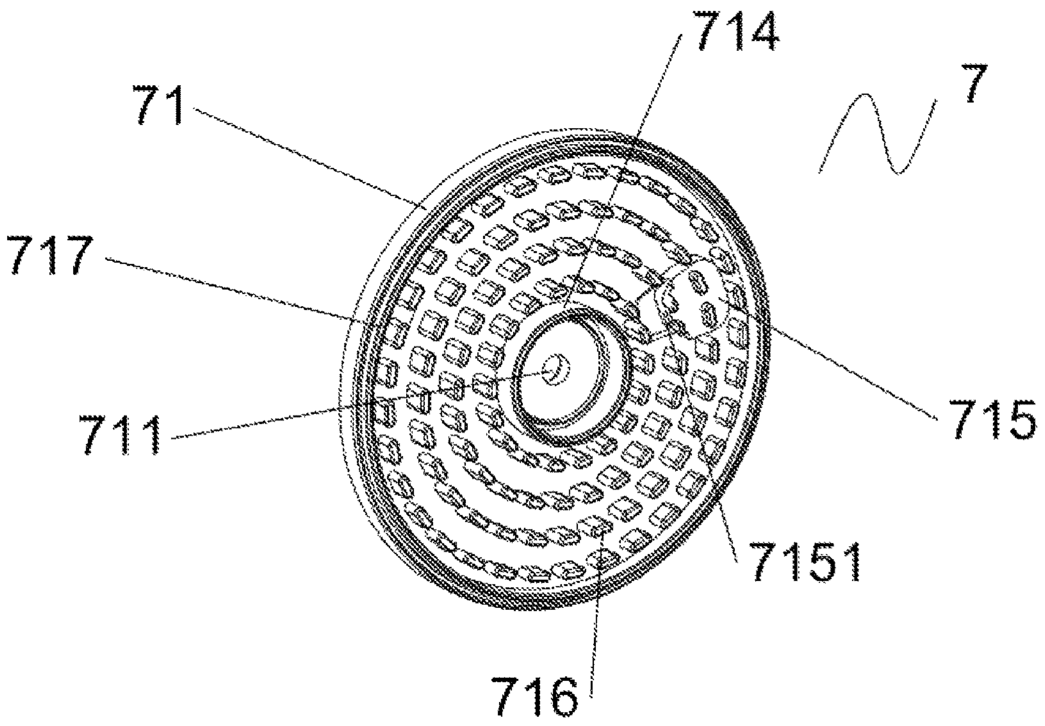
FIG. 8 is a three-dimensional schematic view of a structure of a water dispensing plate from the first viewing angle according to an embodiment of the disclosure.
Figure 9:
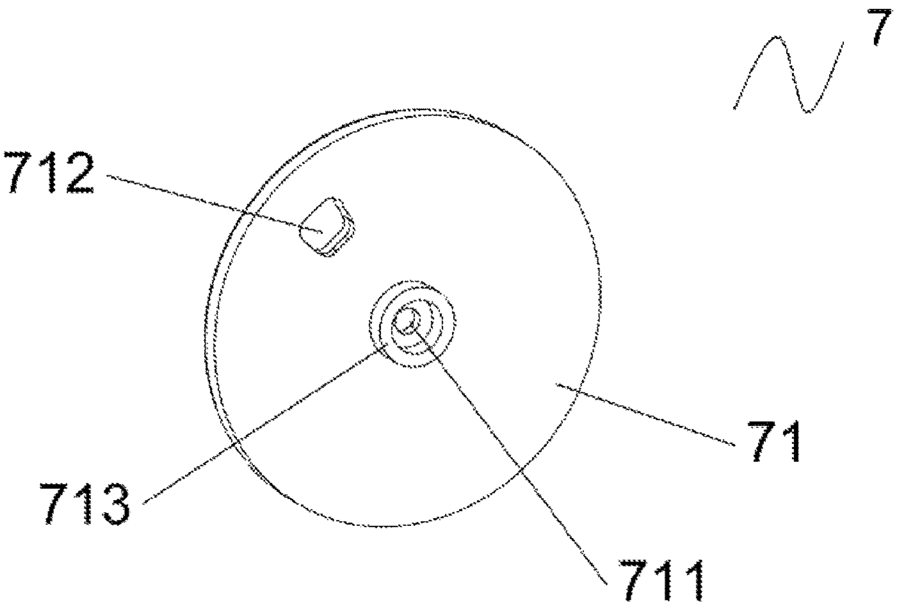
FIG. 9 is a three-dimensional schematic view of the structure of the water dispensing plate from the second viewing angle according to an embodiment of the disclosure.

As shown in FIG. 8 and FIG. 9, the water dispensing plate 7 includes a water dispensing plate body 71. The water dispensing plate body 71 is a circular surface plate and is provided with a screw hole 711 and a first water passage hole 712 penetrating the water dispensing plate body 71. The screw hole 711 is located in a central position of the water dispensing plate body 71. A second shaft sleeve 713 fitted to the first rotating shaft 113 protrudes from a surface of one side of the water dispensing plate body 71, and the second shaft sleeve 713 is located outside the screw hole 711 and is coaxial with the screw hole 711. A first ring wall 714, a boss 715, a plurality of third protruding columns 716, and a first protruding ring 717 protrude from a surface of the other side of the water dispensing plate body 71. The first ring wall 714 is disposed outside the screw hole 711 and is coaxial with the screw hole 711. The boss 715 extends from a hole edge of the first water passage hole 712 and is internally provided with a cavity, and a side wall of one side of the boss 715 perpendicular to the water dispensing plate body 71 is provided with a fourth water passage hole 7151 communicating with the first water passage hole 712. The third protruding columns 716 are uniformly distributed outside the first ring wall 714 in a concentric circle. Each of the third protruding columns 716 located within the boss 715 extends from an outer wall of the boss 715 parallel to the water dispensing plate body 71, and the rest of the third protruding columns 716 extend from the water dispensing plate body 71. The first protruding ring 717 protrudes from an edge of the water dispensing plate 7.

The screw is configured to fix the water dispensing plate 7 onto the head portion 11.

Figure 10:
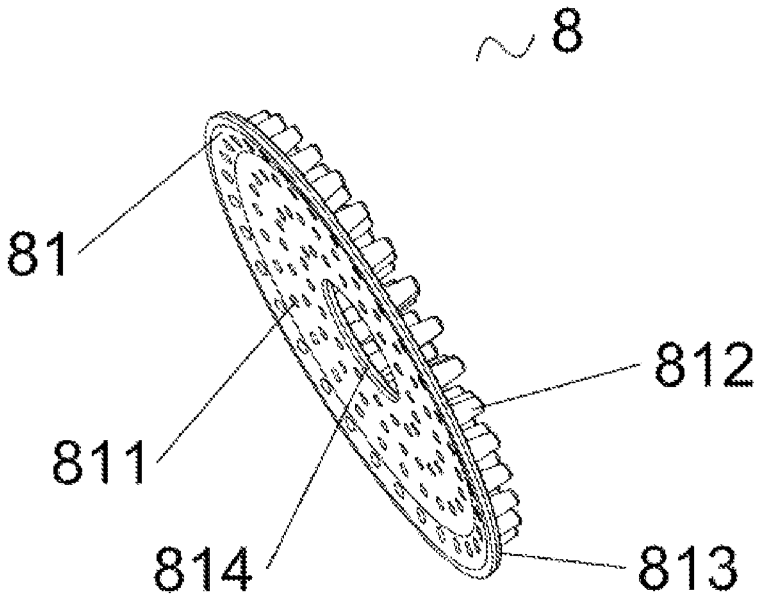
FIG. 10 is a three-dimensional schematic view of a structure of a water outflow plate according to an embodiment of the disclosure.

As shown in FIG. 1 and FIG. 10, the surface cover assembly includes a water outflow plate 8 and a water outflow surface cover 9. The water outflow plate 8 includes a water outflow plate body 81. The water outflow plate body 81 is a circular surface cover, and a third through hole with a same inner diameter as the first ring wall 714 penetrates through a central position of the water outflow plate body 81. Second water outlets 811 arranged together with the protruding columns 716 in an alternating manner are disposed outside the third through hole of the water outflow plate 8. A plurality of water outflow columns 812 extending from hole edges the second water outlets 811 are disposed on a surface of one side of the water outflow plate body 81. A first inserting ring 813 protrudes from a periphery of a surface of the water outflow plate body 81 located on the same side as the water outflow columns 812, and a second inserting ring 814 protrudes from a hole edge of the third through hole on the same side of the water outflow columns 812.

Figure 11:
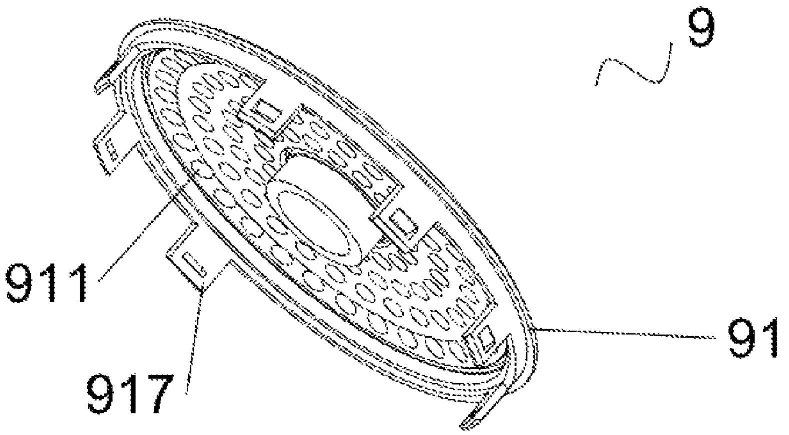
FIG. 11 is a three-dimensional schematic view of a structure of a water outflow surface cover according to an embodiment of the disclosure.
Figure 12:
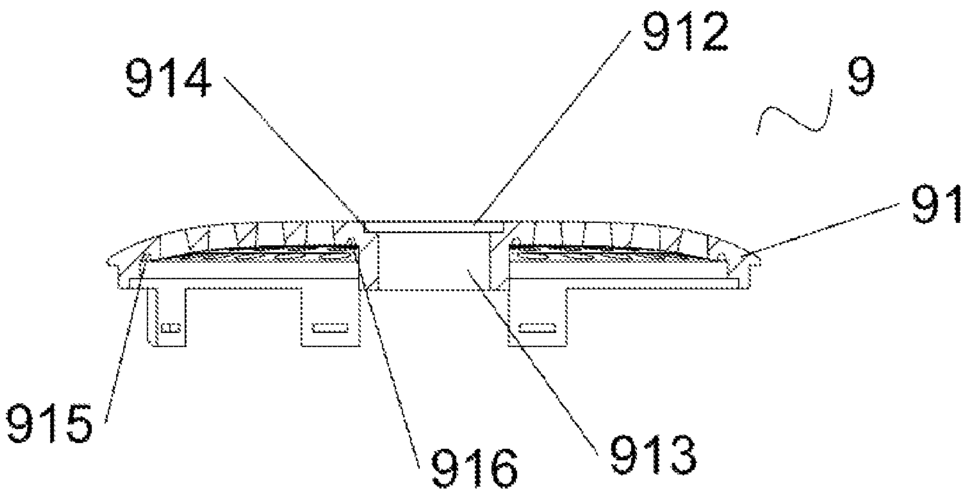
FIG. 12 is a cross-sectional schematic view of the structure of the water outflow surface cover according to an embodiment of the disclosure.

As shown in FIG. 11 and FIG. 12, the water outflow surface cover 9 includes a water outflow surface cover body 91. The water outflow surface cover body 91 is a circular surface cover fitted to the opening end of the head portion 11. A plurality of fourth through holes 911 penetrating the water outflow surface cover body 91 and fitted to the water outflow columns 812 are disposed on the water outflow surface cover body 91. A cylindrical boss is arranged in a central position of a surface of one side of the water outflow surface cover body 91, and an outer diameter of the cylindrical boss is fitted to the inner diameter of the first ring wall 714. A step hole penetrating the cylindrical boss is disposed in a central position on a surface of the other side of the water outflow surface cover body 91 to form a first cavity 912, a second cavity 913, and a third step surface 914. A first inserting groove 915 fitted to the first inserting ring 813, a second inserting groove 916 fitted to the second inserting ring 814, and a plurality of buckles 917 fitted to the first engaging blocks 112 are disposed on a surface of the water outflow surface cover body 91 on the same side as the cylindrical boss.

Figure 13:
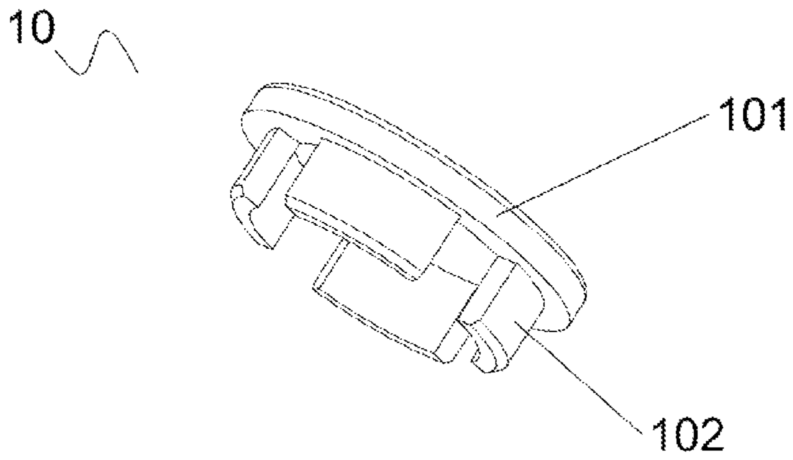
FIG. 13 is a three-dimensional schematic view of a structure of a decoration cover according to an embodiment of the disclosure.
Figure 14:
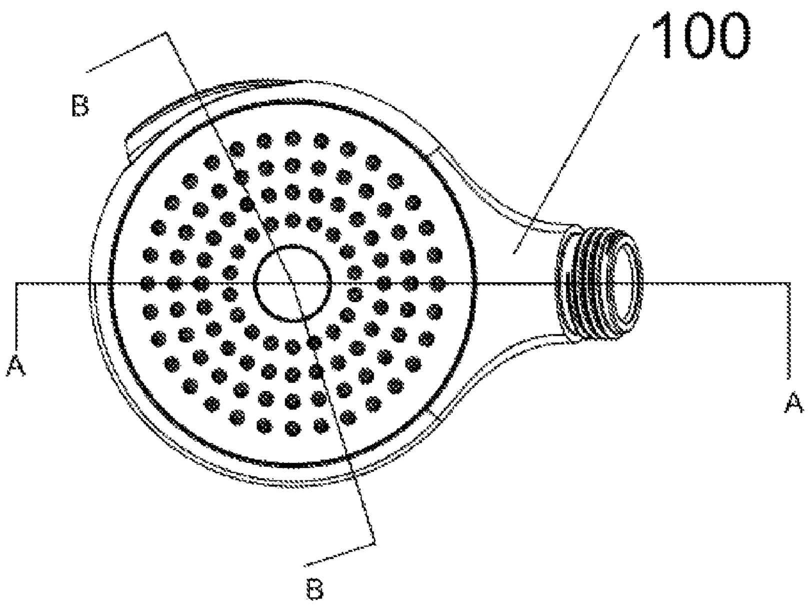
FIG. 14 is a schematic view of assembly of the shower head according to an embodiment of the disclosure.

As shown in FIG. 13, the decoration cover 10 is provided, and the decoration cover 10 includes a decoration cover body 101 and a plurality of inserting pieces 102. The decoration cover body 101 is a circular surface cover, and an outer diameter thereof is fitted to a cavity diameter of the first cavity 912 of the water outflow surface cover 9. The inserting pieces 102 are evenly distributed on a surface of one side of the decoration cover body 101, and an outer diameter of a circle enclosed by each of the inserting pieces 102 is fitted to a cavity diameter of the second cavity 913 of the water outflow surface cover 9.

During installation, in this embodiment, as shown in FIG. 14 to FIG. 17, the rear cover 13 is first engaged with the engaging slots 117 of the head portion 11 through the second engaging blocks 131. The driving plate 42 on the rocker button 41 then extends into the inner cavity of the cylinder of the head portion 11, and the two round buckles 411 thereof are engaged with the two engaging holes 1111 of the button installation hole 111 of the head portion 11 to be rotatably connected to a cylinder wall of the head portion 11. Next, one ends of the two springs among the second elastic members 6 are sleeved outside the two first protruding ribs 1141 of the second installation groove 114 to abut against the bottom portion of the second installation groove 114, and the first leather cup 2 is then installed in the second installation groove 114. Herein, an opening end of the first leather cup 2 abuts against the first step surface 1142, and the sealing rib on an outer wall of the first leather cup 2 is in interference fit with an inner groove wall of the second installation groove 114. The two arc-shaped first protruding blocks 22 on the inner wall of the bottom portion of the first leather cup 2 are opposite to the two first protruding ribs 1141 of the second installation groove 114, and the other ends of the two springs sleeved outside the two first protruding ribs 1141 are sleeved outside the two first protruding blocks 22 and abut against the inner wall of bottom portion of the first leather cup 2. Next, one ends of the rest of the two springs among the second elastic members 6 are sleeved outside the two third protruding ribs 51112 of the third installation groove 5111 and abut against the bottom portion of the first installation groove 5111, and the second leather cup 53 is then installed in the first installation groove 5111. Herein, an opening end of the second leather cup 53 abuts against the second step surface 51113, and the sealing rib on an outer wall of the second leather cup 53 is in interference fit with an inner groove wall of the first installation groove 5111. The third water passage hole 531 directly faces the second water passage hole 51111. The two arc-shaped second protruding blocks 532 on the inner wall of the bottom portion of the second leather cup 53 are opposite to the two third protruding ribs 51112 of the first installation groove 5111, and the other ends of the two springs sleeved outside the two third protruding ribs 51112 are sleeved outside the two second protruding blocks 532 and abut against the inner wall of bottom portion of the second leather cup 53. The first elastic member 32 of the elastic spring plunger 3 is sleeved on the outside of the second protruding column 1162 of the elastic spring plunger groove 116, and one end of an opening of the spring plunger body 311 of the spring plunger 31 extends into the elastic spring plunger groove 116. The cylindrical body of the spring plunger body 311 is sleeved outside the first elastic member 32. One end of the first elastic member 32 abuts against the second protruding rib 1161 on the bottom portion of the elastic spring plunger groove 116, and the other end of the first elastic member 32 abuts against an inner wall of the bottom portion of the spring plunger body 311. An opening end of the spring plunger body 311 abuts against the second protruding rib 1161, and the positioning bead 312 extends out of the elastic spring plunger groove 116. The first shaft sleeve 5121 of the rotation plate 51 is then sleeved on first rotating shaft 113, one end of the first shaft sleeve 5121 away from the opening of the head portion 11 abuts against the limiting surface formed by the first protruding columns 1131. Herein, one side of the first sector plate 511 of the rotation plate 51 provided with the positioning grooves 5112 faces the elastic spring plunger 3 and abuts against the first leather cup 2, the positioning bead 312 of the elastic spring plunger 3 is located in any positioning grooves 5112, and the transmission rack 52 is meshed with the driving rack 421 of the driving mechanism 4. Next, the second shaft sleeve 713 of the water dispensing plate 7 is sleeved outside the first rotating shaft 113, the screw is inserted through the screw hole 711 on the water dispensing plate 7 and extends into the threaded hole of the first rotating shaft 113, and the water dispensing plate 7 is then securely screwed on the first rotating shaft 113. One side of the water dispensing plate 7 away from the opening end of the head portion 11 and the inner wall of the cylinder of the head portion 11 hermetically enclose and form an installation cavity. Herein, the rotation plate 51 is sandwiched in the installation cavity by the limiting surface of the first rotating shaft 113 and the end surface of the second shaft sleeve 713 of the water dispensing plate 7, the first sector plate 511 of the rotation plate 51 securely abuts against the first leather cup 2, the second leather cup 53 on the rotation plate 51 securely abuts against the water dispensing plate 7, and the first water passage hole 712 on the water dispensing plate 7 is opposite to the first water outlet 21 of the first leather cup 2. The first inserting ring 813 and the second inserting ring 814 of the water outflow plate 8 are respectively inserted into the first inserting groove 915 and the second inserting groove 916 of the water outflow surface cover 9, and in this way, the water outflow columns 812 of the water outflow plate 8 extend out of the fourth through holes 911 of the water outflow surface cover 9. The water outflow surface cover 9 is then engaged with the first engaging blocks 112 on the opening end of the head portion 11 through the buckles 917 to be fixed onto the head portion 11. Herein, a hole edge of a third step hole of the water outflow surface cover 9 close to one end of the water dispensing plate 7 abuts against the water dispensing plate 7, and each of the third protruding columns 716, the first protruding ring 717, and the first ring wall 714 of the water dispensing plate 7 abut against the water outflow plate 8. In this way, the water outflow plate 8 is closely attached to the water outflow surface cover 9, and one side of the water dispensing plate 7 close to the water outflow plate 8 and the surface cover assembly hermetically enclose and form a water outflow cavity. Herein, the first water passage hole 712 and the fourth water passage hole 7151 on the water dispensing plate 7 communicate with the water outflow columns 812 on the water outflow plate 8. Finally, the inserting pieces 102 of the decoration cover 10 extend into the second cavity 913 of the water outflow surface cover 9 to be in interference fit with the second cavity 913, and a surface of the decoration cover body 101 located outside the inserting pieces 102 abuts against the third step surface 914, and installation is completed.

During implementation, in this embodiment, as shown in FIG. 15 and FIG. 17 to FIG. 19, the handle portion 12 is configured to communicate with the external water outlet, and water flows into the head portion 11 through the water inlet channel. When flowing inside the head portion 11, water first flows out of the water inlet channel from the first water outlet 21 of the first leather cup 2, flows towards the second leather cup 53 through the second water passage hole 51111 on the rotation plate 51, and flows out through the third water passage hole 531. The water then enters the water outflow cavity after passing through the first water passage hole 712 and the fourth water passage hole 7151 of the water dispensing plate 7 and is sprayed from the water outflow columns 812 of the water outflow plate 8. In an initial state, the positioning bead 312 of the elastic spring plunger 3 is located in the positioning groove 5112 located in the middle part. Herein, a water outflow area which is an overlapped area of the first water outlet 21 on the first leather cup 2 and the second water passage hole 51111 on the rotation plate 51 is only half of the first water outlet 21, which is a low water outflow mode. In the initial state, one end of the rocker button 41 close to the handle portion 12 is pressed, and the rocker button 41 drives the driving plate 42 to rotate counterclockwise. The driving rack 421 drives the transmission rack 52, so that the rotation plate 51, after rotating counterclockwise, is meshed with the transmission rack 52 through the driving rack 421 for positioning. During this process, the positioning bead 312 of the elastic spring plunger 3 moves in a clockwise direction relative to the rotation plate 51 into the adjacent positioning groove 5112 to perform positioning at the same time. Herein, the first water outlet 21 on the first leather cup 2 completely overlaps the second water passage hole 51111 on the rotation plate 51, which is a high water outflow mode. In the initial state, one end of the rocker button 41 away from the handle portion 12 is pressed, and the rocker button 41 drives the driving plate 42 to rotate clockwise. The driving rack 421 drives the transmission rack 52, so that the rotation plate 51, after rotating clockwise, is meshed with the transmission rack 52 through the driving rack 421 for positioning. During this process, the positioning bead 312 of the elastic spring plunger 3 moves in a counterclockwise direction relative to the rotation plate 51 into the adjacent positioning groove 5112 to perform positioning at the same time. Herein, the first water outlet 21 on the first leather cup 2 is blocked by the first sector plate 511 next to the second water passage hole 51111, and a minimum overlapped area is provided, which is a water outflow pause mode. By pressing the rocker button 41, the shower head may be adjusted to be switched between the three modes of the low water outflow mode, the high water outflow mode, and the water outflow pause mode. It should be understood that, in this embodiment, the driving rack 421 and the transmission rack 52 rotate at the same angle and may also rotate at multiple angles by setting the two racks to be provided with different diameters. The elastic spring plunger 3 is provided for enhancing the stability of positioning and a sense of gear shifting, and if the elastic spring plunger 3 is removed, instead of switching between the three modes of the low water outflow mode, the high water outflow mode and the water outflow pause mode, the shower head may be adjusted within a broader range to acquire more different flowing amount. In the case that the elastic spring plunger 3 is removed or another positioning groove 5112 is added, by changing the numbers or sizes of the first water outlet 21 and water passage holes and adding corresponding waterways in the water outflow cavity, water outflowing may be switched and the flowing amount may be adjusted at the same time.

In this embodiment, the shower head 100 includes the shower head body 1, the first leather cup 2, the surface cover assembly, the water dispensing plate 7, and the adjusting device. The shower head body 1 is provided with the water inlet channel, the first leather cup 2 is hermetically fixed onto the water inlet channel, and the first water outlet 21 penetrates the first leather cup 2 and communicates with the water inlet channel. The water dispensing plate 7 is located between the shower head body 1 and the surface cover assembly. Two sides of the water dispensing plate 7 cooperate with the shower head body 1 and the surface cover assembly respectively to hermetically enclose the installation cavity and the water outflow cavity. The water dispensing plate 7 is provided with the first water passage hole 712 communicating with the water outflow cavity. The adjusting device includes a driving mechanism 4 and a rotating mechanism 5. The driving mechanism 4 is rotatably connected to the shower head body 1 and includes an operating portion at least partially exposed outside the shower head body 1. The rotating mechanism 5 is rotatably connected to the installation cavity and is provided with the second water passage hole 811. The rotating mechanism 5 hermetically abuts against the first leather cup 2 and the water dispensing plate 7 respectively. The rotating mechanism 5 is driven by the driving mechanism 4 to rotate to adjust the water outflow area which is formed by the overlapped area of the first water outlet 21 and the second water passage hole 811. In this way, water may flow into the water outflow cavity only after flowing towards the first water passage hole 712 of the water dispensing plate 7 through the first water outlet 21 and the second water passage hole 811. The water may not flow into other positions of the installation cavity, and the adjusting device may not be soaked in the water. The rotating mechanism 5 is driven to rotate through the driving mechanism 4, such that the size of the overlapped area of the first water outlet 21 and the second water passage hole 811 may be adjusted, and the flowing amount may be adjusted or water outflowing may be paused. In this embodiment, the water inlet channel of the shower head body 1 is hermetically provided with the first leather cup 2. The first leather cup 2 is provided with the first water outlet 21, such that water in the water inlet channel may flow into the shower head body 1 only through the first water outlet 21 on the first leather cup 2, water leakage is thereby prevented from occurring, and the adjusting device is prevented from being soaked in the water. In this embodiment, the driving mechanism 4 includes the rocker button 41 and a driving plate 42. The rocker button 41 is rotatably connected to the shower head body 1 to form the operating portion. One end of the driving plate 42 is fixed onto the rocker button 41, and the other end of the driving plate 42 is provided with the driving rack 421 and extends into the installation cavity of the shower head body 1. The rotating mechanism includes the transmission rack 52 that is rotatably meshed with the driving rack 421. The rocker button 41 may be pressed to drive the driving rack 421 to swing, the transmission rack 52 of the rotating mechanism 5 may be driven to rotate through the driving rack 421, and in this way, the flowing amount may be adjusted or water outflowing may be paused. Further, the driving rack 421 may be matched with the transmission rack 52 to position the rotating mechanism 5. In this embodiment, the rotating mechanism 5 further includes the rotation plate 51 and the second leather cup 53. A surface of the rotation plate 51 facing away from the water dispensing plate 7 abuts against the first leather cup 2. The rotation plate 51 is rotatably connected to the shower head body 1 and is located in the installation cavity, and a surface thereof facing the water dispensing plate 7 is provided with the first installation groove 5111 with an opening facing the water dispensing plate 7. The second water passage hole 51111 is located at the bottom portion of the first installation groove 5111. The transmission rack 52 has an arc shape, is coaxial with the rotation plate 51, is fixed onto the rotation plate 51, and is meshed with the driving rack 421. The second leather cup 53 is hermetically fixed in the first installation groove 5111 and abuts against the water dispensing plate 7, and the third water passage hole 531 communicating with the first water passage hole 712 and the second water passage hole 51111 penetrates the second leather cup 53. In this way, water flowing out of the first water outlet 21 may flow towards the first water passage hole 712 of the water dispensing plate 7 only through the second water passage hole 51111 of the rotation plate 51 and the third water passage hole 531 of the second leather cup 53. The rotating mechanism 5 sandwiched between and hermetically abuts the first leather cup 2 and the water dispensing plate 7. Further, the second leather cup 53 is hermetically installed on the rotation plate 51 through the first installation groove 5111, and in this way, sealing performance is enhanced, water leakage is prevented from occurring, and the adjusting device is prevented from being soaked in water. In this embodiment, the installation cavity of the shower head body 1 is provided with the first rotating shaft 113 extending towards the water dispensing plate 7, and the outer wall of the first rotating shaft 113 is provided with the limiting surface extending outwardly in a radial direction. The rotation plate 51 is sleeved on the first rotating shaft 113 and is sandwiched between the limiting surface and the water dispensing plate 7. The limiting surface and the water dispensing plate 7 limit the position of the rotation plate 51, and the limiting surface allows a space to be kept between the rotation plate 51 and the cavity wall, opposite to the water dispensing plate 7, of the installation cavity of the shower head body 1 and thus facilitates rotation of the rotation plate 51. In this embodiment, the central position of the first rotating shaft is provided with the threaded hole penetrating the first rotating shaft. The water dispensing plate is sleeved on the first rotating shaft and is fixed onto the threaded hole of the first rotating shaft by a screw, and the water dispensing plate is fixed to the shower head body in this way. In this embodiment, a surface of the first leather cup 2 facing the water inlet channel and a surface of the second leather cup 53 facing the rotation plate 51 are both provided with the protruding blocks. The inner cavity wall of the water inlet channel and the bottom portion of the first installation groove 5111 are both provided with the protruding ribs opposite to the protruding blocks. The elastic members are disposed between the protruding blocks and the protruding ribs opposite to each other, such that the first leather cup 2 may always abut against the rotation plate 51, and the second leather cup 53 may always abut against the water dispensing plate 7, sealing performance is thus enhanced, water leakage is effectively prevented from occurring, and the adjusting device is prevented from being soaked in water. In this embodiment, a surface of the rotation plate 51 facing away from the water dispensing plate 7 is circumferentially provided with the three identical positioning grooves 5112. One side, facing away from the positioning groove 5112 in the middle part, of each of the two positioning grooves 5112 located in the upper part and the lower part respectively is provided with the arc-shaped blocking wall 5113. The inner wall of the shower head body 1 opposite to the positioning grooves 5112 is provided with the elastic spring plunger 3, and the elastic spring plunger 3 is configured to be positioned through abutting against the positioning grooves 5112 when the rotation plate 51 rotates. Arrangement of the elastic spring plunger 3 and the positioning grooves 5112 may enhance the sense of gear shifting and at the same time strengthen the stability of the positioning of the rotation plate 51. In this embodiment, the water outflow plate 8 is elastic. A surface of the water dispensing plate 7 opposite to the water outflow plate 8 is provided with the third protruding columns extending in a direction of the water outflow plate 8. The third protruding columns and the water outflow columns 812 are arranged in an alternating manner, and the third protruding columns are configured to press against the water outflow plate 8, such that the water outflow plate 8 is closely attached to the water outflow surface cover 9. In this way, the water outflow columns 812 may extend out of the water outflow surface cover 9 for water outflowing.

The description of the specification and embodiments provided above serve to explain the scope of the disclosure, such description should not be construed as limitations on the scope of the disclosure. Through inspiration provided by the disclosure or the embodiments, modifications, equivalents, or other improvements of the embodiments or part of the technical features of the disclosure obtained by people having ordinary skill in the art by combining general knowledge and common technical knowledge in the art and/or existing art through logical analyses, reasoning, or limited tests fall within the protection scope of the disclosure.

What is claimed is:

1. A shower head, comprising:

a shower head body, provided with a water inlet channel;

a first leather cup, hermetically fixed onto the water inlet channel, wherein a first water outlet penetrates the first leather cup, and the first water outlet communicates with the water inlet channel;

a cover apparatus;

a water dispensing plate, fixedly connected to the shower head body, located between the shower head body and the cover apparatus; wherein two sides of the water dispensing plate respectively cooperate with the shower head body and the cover apparatus to hermetically enclose an installation cavity and a water outflow cavity, and the water dispensing plate is provided with a first water passage hole communicating with the water outflow cavity; and an adjusting device, including a driving apparatus and a rotating apparatus;

wherein the driving apparatus is rotatably connected to the shower head body and includes an operating portion at least partially exposed outside the shower head body, and the rotating apparatus is located inside the installation cavity and hermetically abuts against the first leather cup and the water dispensing plate, the rotating apparatus is provided with a second water passage hole, and the operating portion drives the driving apparatus to drive the rotating apparatus to rotate, so as to adjust a water outflow area which is formed by the overlapped area of the first water outlet and the second water passage hole, wherein the driving apparatus includes a rocker button and a driving plate, wherein the rocker button forms the operating portion and is rotatably connected to a cavity wall of the installation cavity, one end of the driving plate is fixed onto the rocker button, and the other end of the driving plate extends into the installation cavity of the shower head body and is provided with a driving rack, and the rotating apparatus includes a transmission rack rotatably meshed with the driving rack, the rotating apparatus further includes a rotation plate and a second leather cup, wherein the rotation plate is rotatably connected to the shower head body and is located in the installation cavity, a surface of the rotation plate facing away from the water dispensing plate abuts against the first leather cup, a surface of the rotation plate facing the water dispensing plate is provided with a first installation groove that has an opening facing the water dispensing plate, and the second water passage hole is located on a bottom portion of the first installation groove, the second leather cup is hermetically fixed inside the first installation groove and abuts against the water dispensing plate, a third water passage hole penetrates the second leather cup, and the third water passage hole is configured to communicate with the first water passage hole, and the transmission rack has an arc shape and is fixed onto the rotation plate.

2. The shower head according to claim 1, wherein a first rotating shaft extending towards the water dispensing plate is disposed in the installation cavity of the shower head body, and an outer wall of the first rotating shaft is provided with a limiting surface extending outwardly in a radial direction, and the rotation plate is sleeved on the first rotating shaft and is sandwiched between the limiting surface and the water dispensing plate.

3. The shower head according to claim 2, wherein a central position of the first rotating shaft is provided with a threaded hole penetrating the first rotating shaft, and the water dispensing plate is sleeved on the first rotating shaft and is fixed onto the threaded hole of the first rotating shaft by a screw.

4. The shower head according to claim 1, further comprising a plurality of elastic members, wherein a surface of the first leather cup facing an inner cavity of the water inlet channel and a surface of the second leather cup facing the rotation plate are both provided with a plurality of protruding blocks, and an inner cavity wall of the water inlet channel and the bottom portion of the first installation groove are both provided with protruding ribs respectively opposite to the protruding blocks, and one end of each of the elastic members is sleeved outside one of the protruding blocks, and the other end of each of the elastic members is sleeved outside a corresponding one of the protruding ribs opposite to the one of the protruding blocks.

5. The shower head according to claim 1, wherein one end of the rotation plate facing away from the water dispensing plate is circumferentially provided with three identical positioning grooves, and one side, facing away from the positioning groove located in the middle part, of each of the two positioning grooves located in the upper part and the lower part respectively is provided with an arc-shaped blocking wall, and an inner wall of the shower head body opposite to the positioning grooves is provided with an elastic spring plunger, and the elastic spring plunger is configured to be positioned through abutting against the positioning grooves when the rotation plate rotates.

6. The shower head according to claim 1, wherein the cover apparatus includes a water outflow plate and a water outflow surface cover, wherein the water outflow plate is elastic and is provided with a plurality of water outflow columns, the water outflow surface cover is engaged with the shower head body and is provided with a plurality of fourth through holes for the water outflow columns to extend thereout, and the water outflow plate is sandwiched between the water dispensing plate and the water outflow surface cover.

7. The shower head according to claim 6, wherein a surface of the water dispensing plate facing the water outflow plate is provided with third protruding columns extending in a direction of the water outflow plate, and the third protruding columns and the water outflow columns are arranged in an alternating manner, and the third protruding columns are configured to press against the water outflow plate, such that the water outflow plate is closely attached to the water outflow surface cover.

* * * * *